United States Patent [19]

Takanashi

[11] Patent Number: 4,697,259
[45] Date of Patent: Sep. 29, 1987

[54] DISC AUTOMATICALLY SETTING DEVICE OF A DISC PLAYER

[75] Inventor: Hiroyoshi Takanashi, Hamamatsu, Japan

[73] Assignee: Nippon Gakki Seizo Kabushiki Kaisha, Hamamatsu, Japan

[21] Appl. No.: 658,226

[22] Filed: Oct. 5, 1984

[30] Foreign Application Priority Data

Oct. 11, 1983 [JP] Japan .......................... 58-156944[U]
Oct. 11, 1983 [JP] Japan .............................. 58-189601
Oct. 11, 1983 [JP] Japan .............................. 58-189600
Oct. 11, 1983 [JP] Japan .......................... 58-156943[U]

[51] Int. Cl.$^4$ ............................................ G11B 17/04
[52] U.S. Cl. .................................................. 369/75.2
[58] Field of Search ...................... 369/75.2, 77.1, 77.2

[56] References Cited

FOREIGN PATENT DOCUMENTS 56-58167  5/1981  Japan .................................. 369/75.2

Primary Examiner—Steven L. Stephan
Attorney, Agent, or Firm—Spensley Horn Jubas & Lubitz

[57] ABSTRACT

A disc automatically setting device of a disc player, including: a tray assembly supported on a disc player body to be horizontally movable between an open position where an information carrier disc is placed on a disc support portion of the tray assembly and a shut position where the information carrier disc is placed on a turntable and rotated for playback by rotating the turntable; and a clamping assembly movable between an upper limit position and a lower limit position to clamp the information carrier disc against the turntable when the tray assembly is in the shut position. The disc automatically setting device is provided with a cam mechanism for actuating both of the tray assembly and the clamping assembly and with a drive mechanism, mounted on the disc player body, for driving the cam mechanism to actuate the tray assembly and the clamping assembly.

7 Claims, 20 Drawing Figures

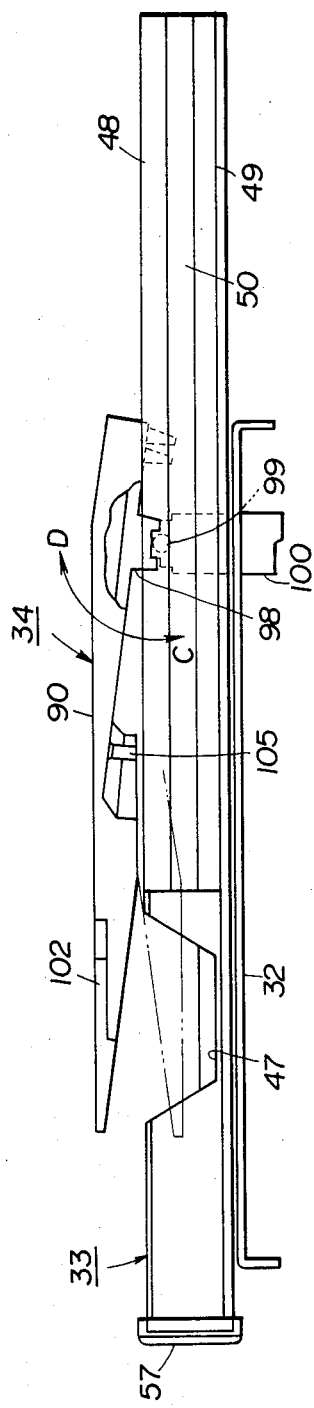
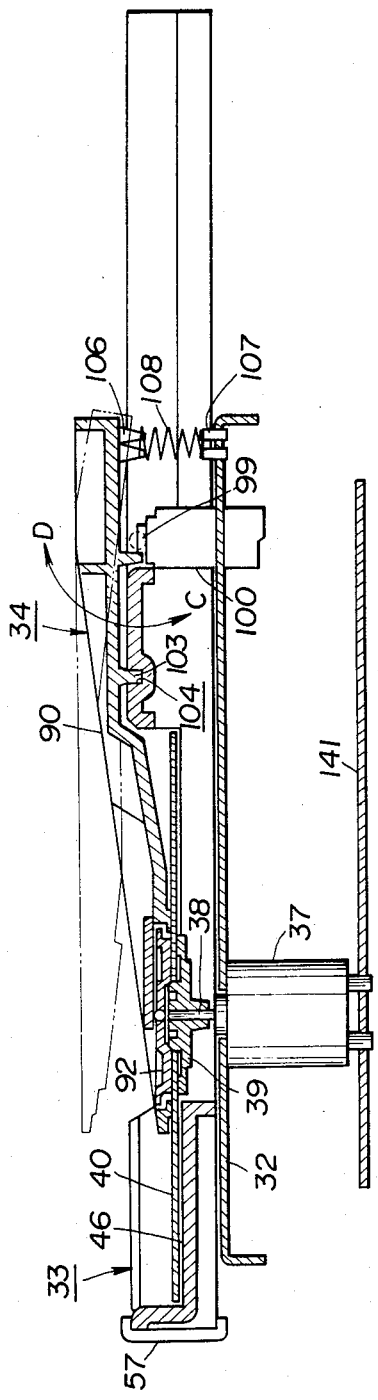

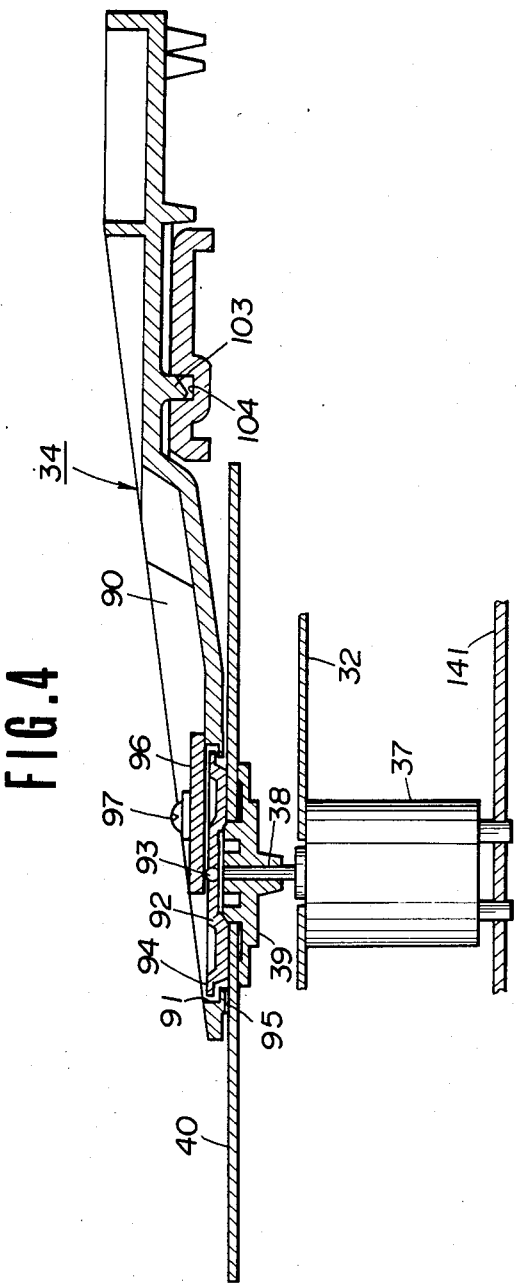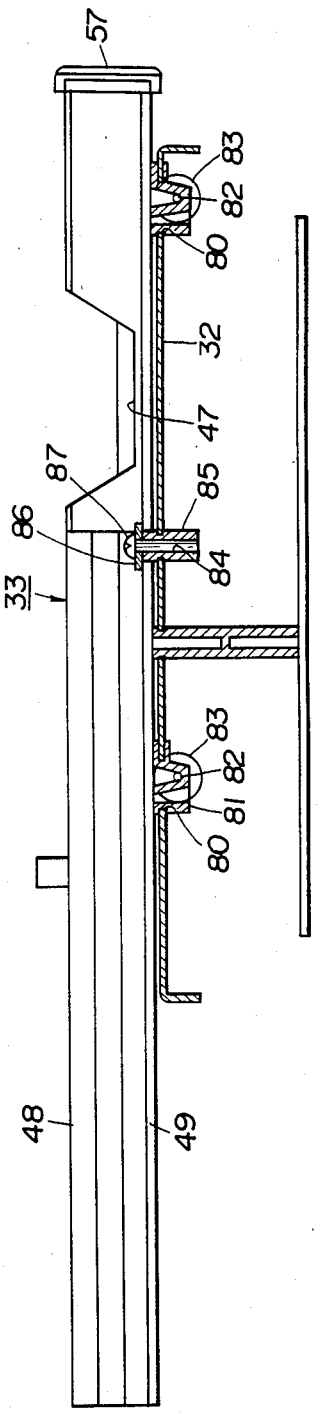

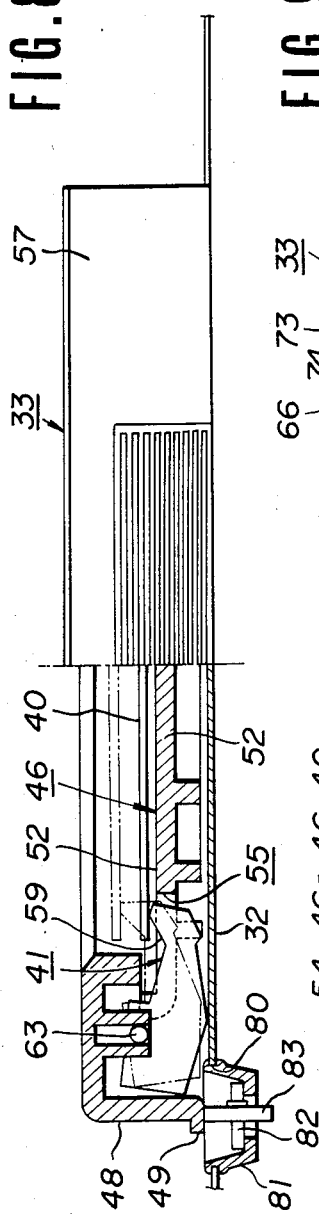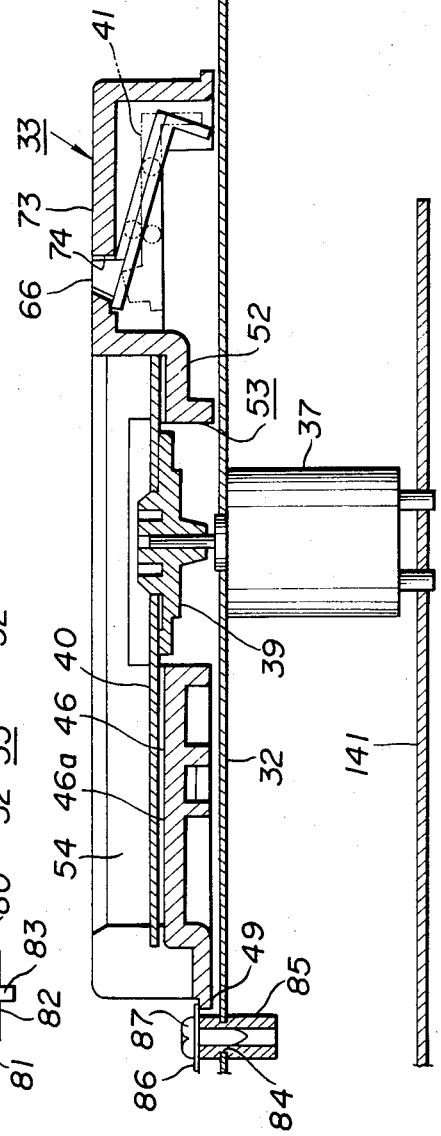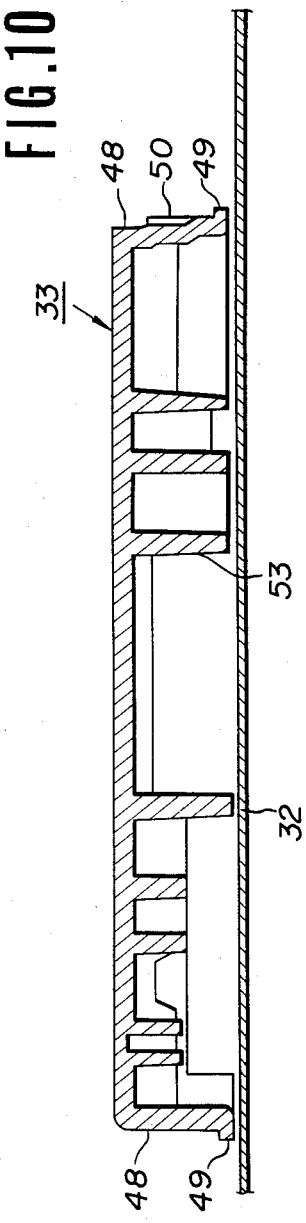

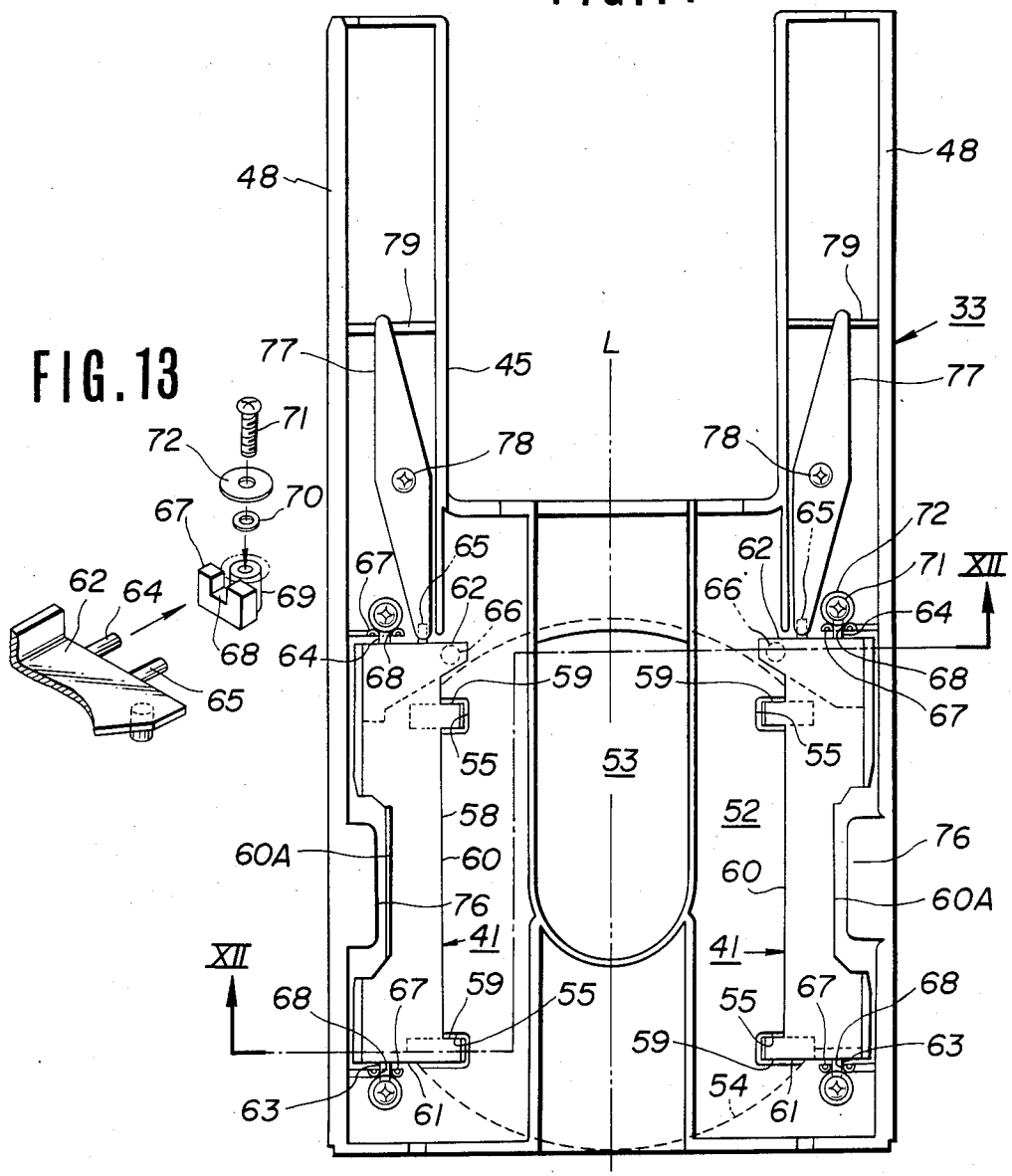

FIG. 16
FIG. 17
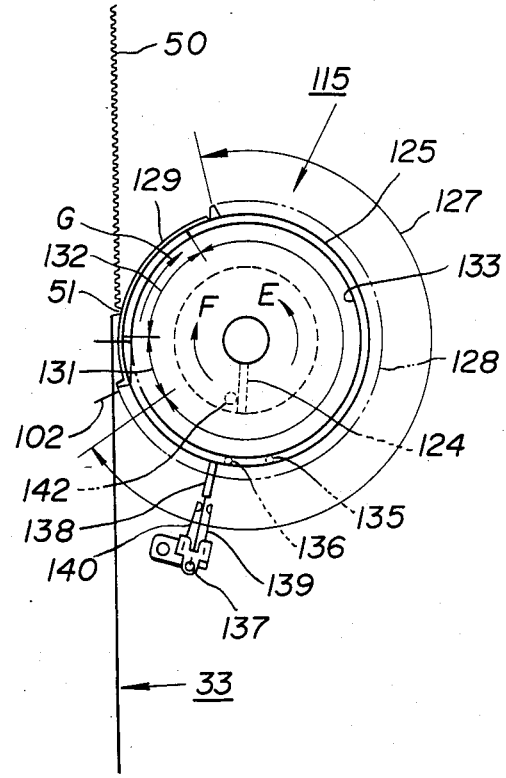
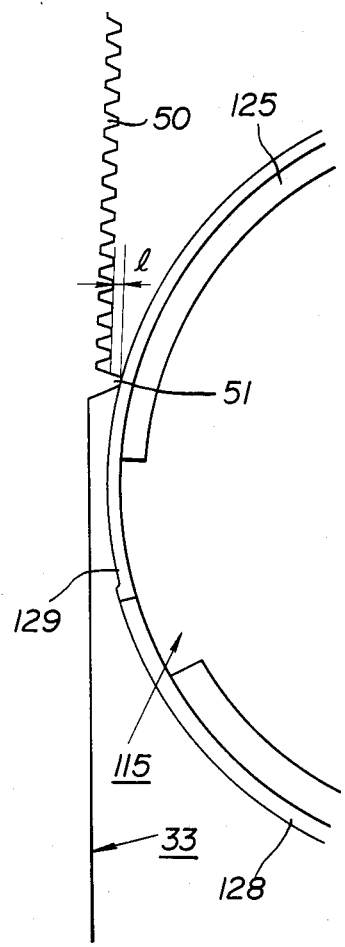

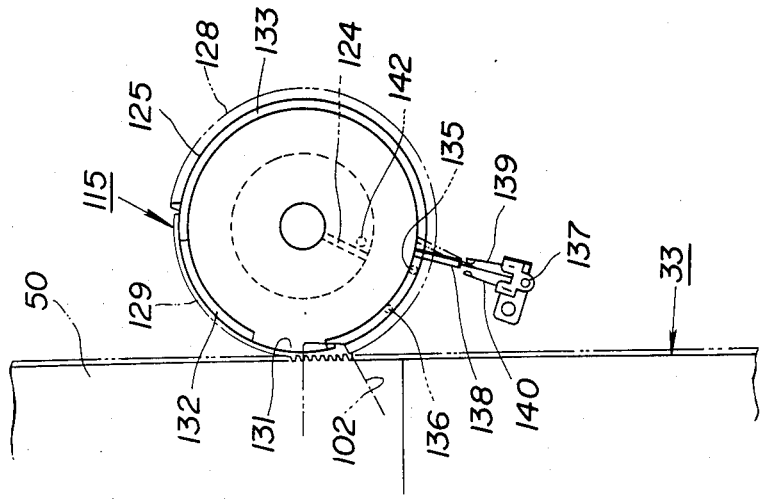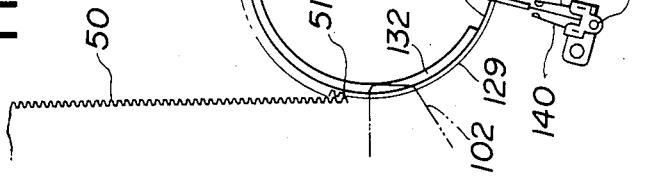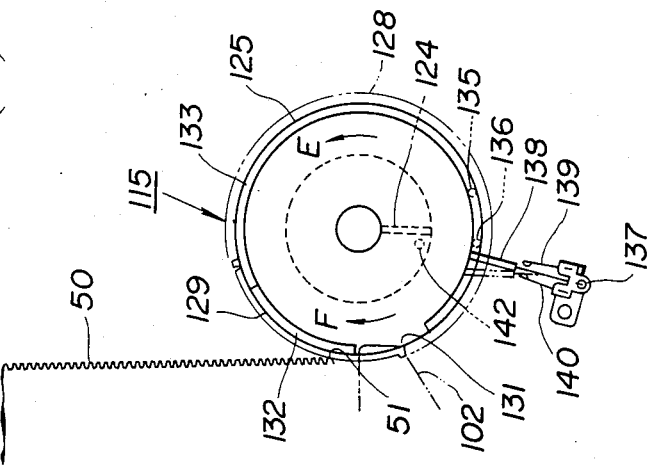

DISC AUTOMATICALLY SETTING DEVICE OF A DISC PLAYER

FIELD OF THE INVENTION

The present invention relates to a disc automatically setting device for use in a disc player, such as a video disc player and a digital audio disc player, for reproducing signals recorded in an information carrier disc, such as a video disc and a digital audio disc, the disc setting device automatically setting the information carrier disc to a turntable.

DESCRIPTION OF THE PRIOR ART

The automatization of the setting of an information carrier disc in a disc player enhances operability of the player, protects the information carrier disc used and the disc player since the disc is automatically set in a predetermined sequence, and enables to accurately set the information disc in position. In the digital audio disc player which has recently made rapid progresses such as a compact disc player of the compact disc digital audio system, the disc setting device is automatized in view of these advantages.

In a typical example of the disc automatically setting device of the conventional compact disc player, a tray assembly having a disc supporting portion is provided to the disc player body. The tray assembly is arranged to be movable between an open position where the disc supporting portion thereof is positioned outside the disc player body and a shut position where the disc supporting portion is located above the turntable within the disc player body. A tray driving means, such as an electric motor, for moving the tray assembly between these two positions is provided within the disc player body. A clamping assembly is further provided within the disc player body for clamping a disc placed on the disc supporting portion against the turntable when the tray assembly is in the shut position. This clamping assembly is actuated by a driver such as an electric solenoid.

To actuate the conventional disc automatically setting device, first of all the tray assembly is pulled out of the disc player body and moved to the open position to expose the disc supporting portion to the outside by actuating the tray drive mechanism. After the disc is placed on the disc supporting portion in the open position, the tray assembly is moved by depressing a button switch for shutting it to the shut position, and then the driver for actuating the clamping assembly is energized in an interlocking relationship with this operation of the tray assembly to actuate the clamping assembly to thereby clamp the information carrier disc against the turntable. The disc of the turntable is thereafter rotated for playback by depressing a play button switch.

The prior art disc automatically setting device is provided with separate driving mechanisms for the tray assembly and for the clamping assembly, and has drawbacks in that the driving mechanisms and the control system for giving operation timing to the tray assembly and the clamping assembly are rather complicated.

SUMMARY OF THE INVENTION

Accordingly, it is an object of the present invention to provide a disc automatically setting device of a disc player, which device is less complicated in the structure of the driving mechanism and the timing control system for the tray assembly and the clamping assembly than the prior art disc automatically setting device.

With this and other objects in view the present invention provides a disc automatically setting device of a disc player, including: a tray assembly supported on a disc player body to be horizontally movable between an open position where an information carrier disc is placed on a disc support portion of the tray assembly and a shut position where the information carrier disc is placed on a turntable and rotated for playback by rotating the turntable; and a clamping assembly movable between an upper limit position and a lower limit position to clamp the information carrier disc against the turntable when the tray assembly is in the shut position. The disc automatically setting device according to the present invention comprises: a cam mechanism for actuating the tray assembly and the clamping assembly in a predetermined sequence; and a drive mechanism mounted on the disc player body, for driving the cam mechanism to actuate the tray assembly and the clamping assembly.

BRIEF DESCRIPTION OF THE DRAWINGS

In the drawings:

FIG. 2 is a view taken along the line II—II in FIG. 1;

FIG. 3 is a view taken along the line III—III in FIG. 1;

FIG. 4 is an enlarged view of an essential part of the disc automatically setting device in FIG. 3;

FIG. 5 is a view taken along the line V—V in FIG. 1;

FIG. 8 is an enlarged view taken along the line VIII—VIII in FIG. 1;

FIG. 9 is an enlarged view taken along the line IX—IX in FIG. 1;

FIG. 10 is an enlarged view taken along the line X—X in FIG. 1;

FIG. 11 is a bottom view of the tray assembly in FIG. 1;

FIG. 12 is a view taken along the line XII—XII in FIG. 11;

FIG. 13 is an exploded view of the supporting structure of the lifter in FIG. 11;

FIG. 16 is an enlarged plan view of the cam member in FIG. 1;

FIG. 17 is an enlarged view of a portion of the cam member in FIG. 16 illustrating a relation in structure of the cam member, the rack and the projection of the tray assembly; and FIGS. 18(A) to 18(C) illustrate the operation of the cam member.

DETAILED DESCRIPTION OF THE PREFERRED EMBODIMENT

Figure 1:
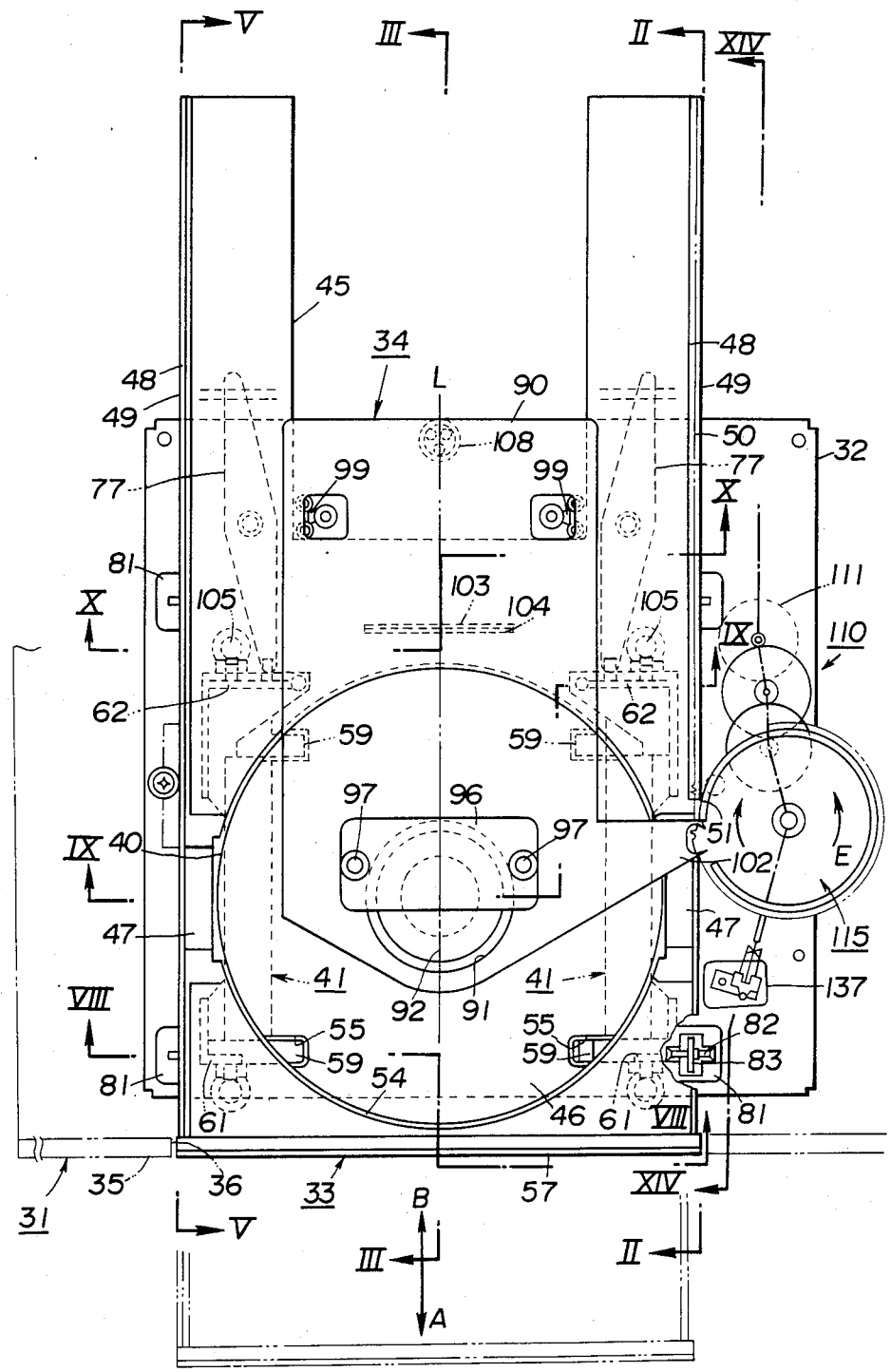
FIG. 1 is a plan view of a disc automatically setting device constructed according to the present invention.
Figure 6:
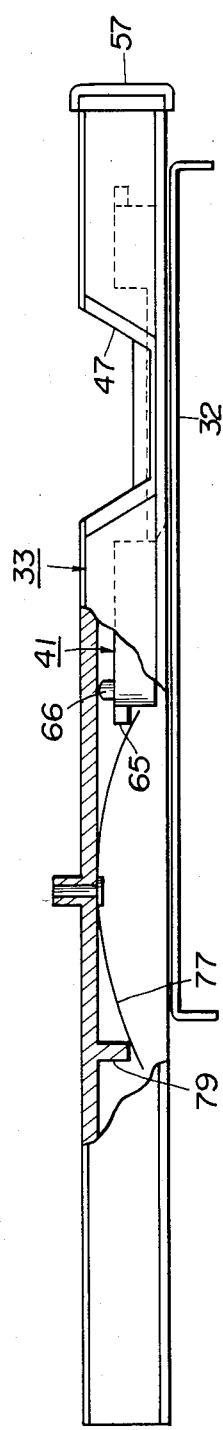
FIG. 6 is a view, with portion broken away, of the disc setting device in FIG. 5.

Referring to FIGS. 1 to 3, reference numeral 31 designates a body of a compact disc player of the compact disc digital audio system as a digital audio disc player, 32 a chassis fixed within the player body 31, 33 a tray assembly supported on the chassis 32, and 34 a clamping assembly disposed above the chassis 32.

The chassis 32 is a substantially rectangular plate, which is horizontally arranged with its front end being disposed adjacent to a rectangular opening 36 formed in a front panel 35 of the player body 31. An electric motor 37 for disc drive is fastened to the lower face of the chassis 32 so that a rotation shaft 38 thereof passes through and projects upwards from the chassis 32 as shown in FIGS. 3, 4 and 9. A turntable 39 is fastened to the rotation shaft 38.

In order to carry a disc 40 between the outside and inside of the player body 31, the tray assembly 33 is supported to be movable between a shut position, shown by the solid lines in FIGS. 1–3, 5–7 and 14, and an open position where the tray assembly 33 is open to the outside of the player body 31. The tray assembly 33 is provided with a pair of lifters 41 and 41 for lifting the disc 40 when the latter is transported by the tray assembly 33 and for lowering the disc 40 when it is positioned above the turntable 39.

The tray assembly 33 is detailedly illustrated in FIGS. 1, 2 and 5–13. The tray assembly 33 is a substantially rectangular plate member having a rectangular cutout 45 formed at the rear end portion thereof as best seen in FIG. 11. The tray assembly 33 is provided at the front portion thereof with a circular recess, as a disc supporting portion 46, open upwards and is further provided on each lateral side with a side wall 48 depending downwardly of the each lateral edge thereof. The tray assembly 33 has a recess 47 formed at the periphery of each lateral side thereof to communicate to the disc supporting portion 46. Each side wall 48 terminates in a flange 49 projecting horizontally outwardly thereof and serving as a supporting rail. The right side wall 48, which is disposed at the right side in FIG. 1, is provided on the outer face thereof with a rack 50 so that the rack horizontally extends from a portion adjacent to the recess 47 to the rear end of the right side wall 48. The rack 50 has a projection 51 formed at the front end thereof, the projection 51 projecting laterally outwards. The projection 51 will be hereinafter described in more detail. As clearly shown in FIGS. 9–11, the disc support portion 46 is provided at the bottom wall 52 with a cutout 53 which extends backwards from the center portion of the bottom wall 52. The cutout 53 passes through the peripheral wall 54 of the disc support portion 46 and communicates to the cutout 45. The bottom wall 52 is provided adjacent to the peripheral wall 54 with four through hole 55, . . . for passing claws 59 of the lifters 41 and 41.

The tray assembly 33 is provided at the front thereof with a front plate 57 and on the lower side with the lifters 41 and 41, as shown in FIG. 11, symmetrically disposed with respect to the center L thereof. Each lifter 41 includes an elongated lifter body 58 having a pair of claws 59 which project sidewards from opposite end portions of an inner lateral edge thereof. The lifter body 58 has a push stub 66 formed at the upper side of the rear end thereof and further has a front wall 61 and a rear wall 62 integrally and vertically formed at the front and rear ends thereof respectively.(FIG.1) The front wall 61 and rear wall 62 are respectively provided with stub shafts 63 and 64 which project from them along the longitudinal axis of the lifter body 58. The rear wall 62 is further provided with an engaging projection 65 which projects rearwards. The two lifters are symmetrically formed.

Each lifter 41 is disposed to extend fore and aft so that the claws 59 and 59 may be positioned within corresponding holes 55 and 55 of the disc support portion 46, and so that the stub shafts 63 and 64 engage with grooves 68 and 68 formed in supporting walls 67 and 67 (FIG. 13) which are erected on the lower face of the tray assembly 33 to face each other. Adjacent to each supporting wall 67 the tray assembly 33 is provided with a projection 69, to which is, as shown in FIGS. 11 and 13, fastened an annular plate 72 by means of a screw 71 and a washer 70 so that the annular plate 72 engages the distal end of the stub shaft 63 or 64 so as to prevent the distal end from disengaging from the groove 68 of the supporting wall 67. The lifters 41 and 41 thus assembled are angularly movable about the stub shafts 63 and 64 so that each claw 59 moves vertically through the hole 55 to cause the distal end thereof to project or retard from the bottom 52 of the disc supporting portion 46. As shown in FIGS. 9 and 11, each lifter 41 is movable between a lower position, shown by the phantom line, where the outer lateral edge 60A comes into abutment with a stopper 76 formed at each side wall 48 and an upper limit position, shown by the solid line, where the upper edge of the rear wall 62 abuts a wall 73 of the tray assembly 33. In the upper limit position the push stub 66 is placed within a hole 74 formed through the upper wall 73. Each lifter 41 is spring biased by a substantially elongated diamond-shaped leaf spring 77 in a direction to raise the claws 55. More specifically, the leaf spring 77 is, as shown in FIGS. 7 and 11, attached at the center portion thereof to the lower face of the tray assembly 33 by a screw 78 so that one end thereof engages with a rib 79 formed at the lower face of the tray assembly 33 and so that the other end resiliently contacts the projection 65 to urge the latter upwards.

The tray assembly 33 thus mounted with a pair of lifters 41 and 41 is arranged above the chassis 32 in the following manner for movement in fore and aft (in the directions shown by the double-headed arrow AB in FIG. 1). In each lateral side portion of the chassis 33, there is, as shown in FIGS. 5 and 8, formed two through holes 80 and 80 along the passage of the supporting rail 49 of the corresponding side wall 48. A roller supporting member 81 is fitted to the periphery of each hole 80 by outsert molding. Each supporting member 81 supports a roller 83 through a rotation shaft 82, around which the roller 83 is mounted, so that the roller 83 rotates about a horizontal axis. The tray assembly 33 is placed above the chassis 32 so that the lower faces of the rails 49 and 49 rest on the four rollers 83, . . . The chassis 32 is, as shown in FIGS. 1, 5 and 9, provided in each lateral side portion near the rail 49 of the tray assembly 33 with a through hole 84, around which is vertically formed a guide pipe 85 by outsert molding. The two guide pipes 85 are positioned outside the rails 49 of the tray assembly 33 to prevent the tray assembly 33 from moving sidewards. A washer 86 is fastened by a screw 87 to the upper end of each guide pipe 85 and is positioned just above the upper face of the corresponding rail 49 to prevent the tray assembly 33 from moving upwards. With such a construction the tray assembly 33 is smoothly movable fore and aft by making a rolling contact with the rollers 83, . . . between the shut position and the open position. Although the turntable 39, as shown in FIG. 9, projects upwards from the level of the bottom wall 52 of the tray assembly 33, it does not make any contact with the tray assembly 33 even in the traveling of the latter because of the provision of the cutout 53. When the disc 40 is carried by the disc supporting portion 46 of the tray assembly 33, it is raised to a lifted position shown by the phantom line in FIG. 8 and hence there is no possibility that the disc 40 contacts the turntable 39 during transportation thereof.

Figure 7:
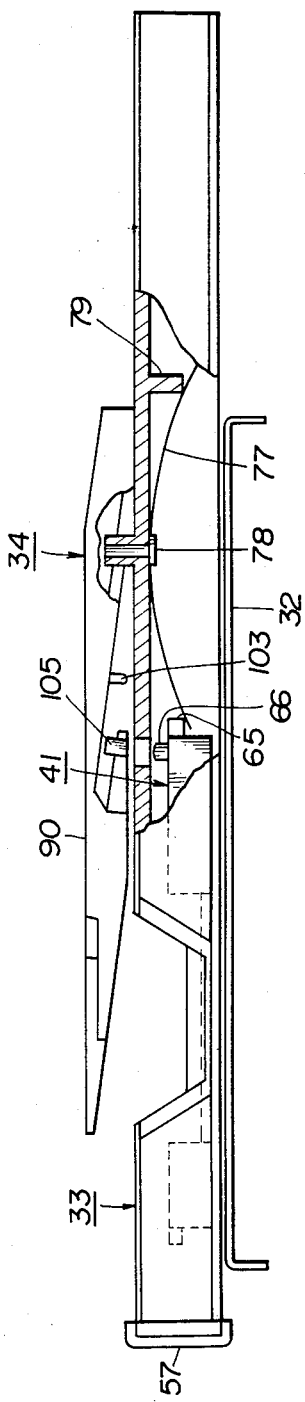
FIG. 7 is a view, with portions broken away, of the disc setting device in FIG. 2.
Figure 14:
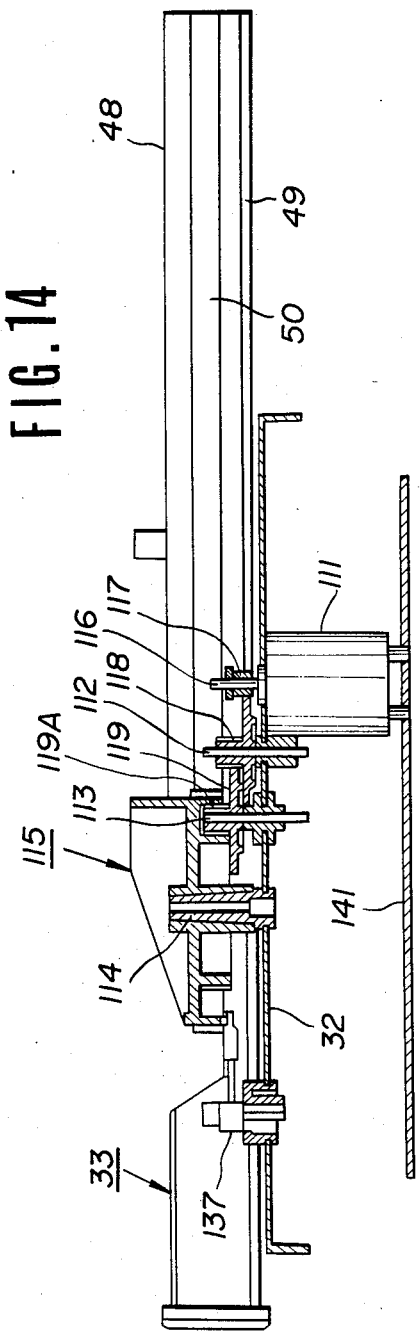
FIG. 14 is a view taken along the line XIV—XIV in FIG. 1.

The clamping assembly 34 is detailedly illustrated in FIGS. 1–4 and 7. The clamping assembly 34 includes a generally rectangular clamping body 90 made of a plate. The clamping body 90 is provided at the front end portion thereof with a circular through hole 91, into which is fitted a disc-shaped clamping disc 92 for clamping the disc 40 in cooperation with the turntable 39. The clamping disc 92 has a steel ball 93 (FIG. 4) fixedly fitted into a hole formed in the center thereof. The clamping plate 92 has a peripheral flange 94 projecting radially outwardly from the periphery thereof. The peripheral flange 94 is designed to engage with an inner flange 95 formed at the peripheral wall of the hole 91 to project radially inwards and hence the clamping disc 92 is prevented from dropping out of the hole 91 by the engagement of the peripheral flange 94 with the inner flange 95. Further, a cover plate 96 is attached by means of screws 97 and 97 to the upper side of the clamping body 90 to cover a half of the opening of the hole 91 for preventing the clamping plate 92 from moving upwards out of the hole 91. On the lower side of the clamping body 90 near the rear end thereof there are formed a pair of brackets 98 and 98 each having a shaft 99 projecting sidewards so that the brackets 98 and 98 are symmetrically disposed with respect to the center line L shown in FIG. 1. Each shaft 99 is rotatably supported on a supporting member 100, provided to the chassis 32 by outsert molding, in the same manner as the shafts 63 and 64 of the lifter 41 so that the clamping assembly 34 is angularly movable in the directions shown by the double-headed arrow CD in FIGS. 2 and 3. When the clamping assembly 34 is swung in the direction C, the center of the clamping disc 92 turns towards the center of the turntable 39. The clamping body 90 is provided at the one end portion thereof with a cam follower 102 projecting sidewards, rightwards in FIG. 1, and on the lower side thereof with a downwardly projecting ridge 103 which is formed to laterally extend in front of the brackets 98 at a predetermined distance. The cam follower 102 extends sidewards beyond the side wall 48 and is controlled in its vertical position by a cam member 115 which will be described hereinafter. The ridge 103 is designed to fit into a recess 104 formed in the upper face of the rear portion 73 of the tray assembly 33 to lock the tray assembly 33 when it is in the shut position and when the clamping assembly 34 is in the lower limit position. Furthermore, the clamping body 90 is, as shown in FIGS. 2 and 7, provided on the lower face thereof with a pair of actuator stubs 105 and 105 extending downwards. When the tray assembly 33 is placed in the shut position, each stub 105 depresses the push stub 66 of the corresponding lifter 41 to thereby place the claws 59 and 59 in the lower limit position shown by the solid line in FIG. 8. The clamping body 90 is urged to rotate about the shaft 99 in the direction C by a coil spring 108.(FIG. 3) The coil spring 108 is retained between retaining projections 106, which are integrally formed with the lower face of the rear end thereof, and retaining members 107 fixed to the chassis 32.

Figure 15:
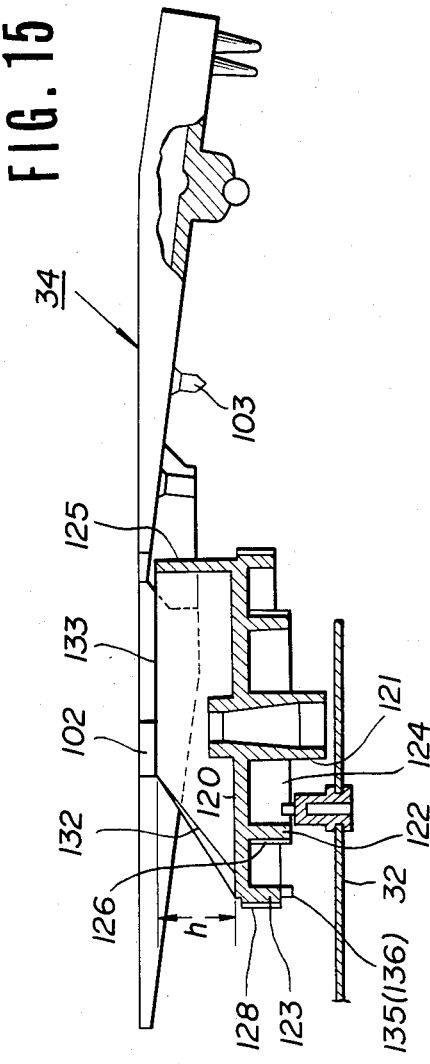
FIG. 15 is an enlarged view, with portions broken away for the sake of clarity, illustrating the structural relationship between the clamping body and the cam member in FIG. 1.

The tray assembly 33 and clamping assembly 34 are actuated by a drive mechanism 110 which are illustrated in FIGS. 1 and 14–17. The drive mechanism 110 includes an electric motor 111 for driving the tray assembly 33 and the clamping assembly 34. The electric motor 111 is mounted to the chassis 32 with the rotation shaft 116 projecting upwards from the chassis 32. The rotational force from the motor 111 is transmitted from a pinion 117, mounted on the rotation shaft 116, through spur gear members 118 and 119 to a cam member 115 rotatably mounted on a shaft 114 which is vertically fixed to the chassis 32 to be located sidewards of the cam follower 102. The spur gear members 118 and 119 are rotatably mounted on respective shafts 112 and 113 mounted on the chassis 32. The cam member 115 is, as shown in FIGS. 15 and 16, provided with a disc portion 120, having a hub 121 integrally formed at the center thereof. The disc portion 120 has concentric circular walls 122 and 123 and a stopper 124 formed on the lower side thereof and has a cam portion 125 formed on the upper side of the periphery thereof. The inner wall 122 is provided at the outer face thereof with a gear 126 which meshes with a pinion 119A of the gear member 119 for transmittance of a rotational force. The outer wall 123 has a toothed portion 128 as a pinion formed in the outer face thereof in the range indicated by the double-headed arrow 127, the toothed portion 128 engaging with the rack 50. The remaining tooth-free portion 129 of the outer face of the wall 123 is roughened for making a frictional contact with the projection 51 of the tray assembly 33. As shown in FIGS. 16 and 17, the projection 51 extends sidewards beyond the top faces of teeth of the rack 50 by a length l, and contacts at its distal end the tooth-free portion 129 with a predetermined frictional force when the tray assembly 33 is in the shut position shown in the drawings. The tray assembly 33 is forced to move forward when the toothed portion 128 comes into engagement with the rack 50 formed in the tray assembly 33 by rotating the cam member 115 in the direction E. The cam portion 125 has a shape of a circular wall concentric with the disc portion 120 and serves as a cylindrical cam in such a manner that the upper edge thereof contacts the cam follower 102 to thereby determine the level of the front end of the clamping body 90. Referring to FIGS. 15 and 16 the height of the cam portion 125 will be described. A region indicated by the double-headed arrow 131 is a flat portion flush with the upper face of the disc portion 120 and a region 132 adjacent to the region 131 is an inclined portion gradually increasing its height in the direction G. Adjacent to the region 132 there is formed a region 133 which is an equiheight wall portion higher than the flat portion 131 by a height h. The cam follower 102 abuts against the edge of the cam portion 125 since the front end of the clamping body 90 is urged to swing downwards by the coil spring 108. Thus, the front end of the clamping body 90 is vertically swung as the cam follower 102 follows the shape of the edge of the cam portion 125 when the latter is rotated. When the cam follower 102 contacts the flat region 131 of the cam portion 125, the clamping disc 92 is placed at a position (lower limit position), as shown by the solid line in FIG. 3, to clamp the disc 40 to the turntable 39, and when the cam follower 102 makes a contact with the equiheight portion 133 the front end of the clamping body 90 is placed at the upper limit position indicated by a phantom line in FIG. 3. The cam portion 125, the toothed portion 128 and the tooth-free portion 129 are formed for actuating the tray assembly 33 and the clamp assembly 34 in a predetermined sequence. It is to be noted that the tooth-free portion 129 is, as shown in FIG. 16, formed to cover a portion of the periphery of the disc portion 120 where the inclined portion 132 of the cam portion 125 is formed. With such a configuration of the tooth-free portion 129 the projection 51 of the tray assembly 33 abuts against the tooth free portion 129 when the clamping body 90 swings vertically.

The outer wall 123 of the cam member 115 is provided at the edge thereof with pins 135 and 136 which are disposed to contact an actuator 138 of a limit switch 137 mounted on the chassis 32 when the cam member 115 is rotated. The limit switch 137 constitutes a part of a control circuit which controls the motor 111, and generates a trigger signal for stopping the motor 111. This control circuit controls the motor 111 in such a manner that when the actuator 138 is urged by the pin 135 or 136 to make an electrical contact with a contact 139 or 140, the cam member 115 is rotated in the reverse direction to allow the actuator 138 to return to the neutral position and is then stopped. This control circuit is provided to a print circuit board 141 together with another control circuit for controlling the disc drive motor 37. These control circuits are activated by depressing various push button switches such as a tray assembly opening switch, tray assembly closing switch, play switch and stop switch (not shown). The stopper 124, which is radially formed between the hub 121 and the inner wall 122, mechanically restricts the rotation of the cam member 115 by impinging upon a stop pin 142 fixed to the chassis 32.

The tray assembly 33, shown by the solid line in FIGS. 1-13, 14, 16 and 17 is in the shut position where it is accommodated in the disc player body 31. In this position, the center of the disc supporting portion 46 of the tray assembly 33 is in alignment with the center of the turntable 39. Assuming that the clamping assembly 34 is, as shown by the solid line in FIG. 3, in the lower limit position where the cam follower 102 contacts the flat portion 131 of the cam portion 125, the clamping disc 92 is in contact with the turntable 39, the actuator stub 105 depresses the push stub 66 of the lifter 41 to thereby place the claws 59 in the lower limit positions, and the ridge 103 is placed in engagement with the recess 104 for locking the tray assembly 33 in the shut position. Further assuming that the disc 40 is, as shown in the drawings, placed on the disc supporting portion 46, the clamping disc 92, in this state, clamps the disc 40 against the turntable 39. The actuator 138 of the limit switch 137 is, in this state, in the neutral position, as shown by the solid line in FIG. 18(A), between the electric contacts 139 and 140.

To play back another information carrier disc, the tray assembly opening button switch is depressed to energize the motor 111, which thus turns the cam member 115 through the pinion 117, gear members 118 and 119 in the direction E. This results in that the cam follower 102 which was in contact with the flat region 131 is brought into contact with the inclined portion 132, as illustrated in FIG. 18(B), and is hence raised to swing the clamping body 90 upwards as the cam member 115 rotates. In this stage the projection 51 of the tray assembly 33 slidably contacts the tooth-free portion 129 of the cam member 115 with a predetermined frictional force. After the cam follower 102 is elevated by the inclined portion 132, it reaches the equiheight portion 133 of the cam member 115. By raising the cam follower 102 in this way, the clamping body 90 is turned in the direction D in FIG. 2. Thus, the clamping of the disc 40 by means of the clamping disc 92 is released, the actuator stub 105 is raised, and the ridge 103 is disengaged from the recess 104. The raising of the actuator stub 105 allows the lifters 41 to turn about the stub shafts 63 and 64 by the leaf springs 77 to thereby raise the claws 59 as shown by the phantom line in FIG. 8 for placing the disc 40 at the upper limit position also shown by the phantom line therein.

When the disc 40 is raised to the upper limit position, the toothed portion 128 of the cam member 115 comes into engagement with the rack 50 of the tray assembly 33 to drive the rack 50 forwards, so that the tray assembly 33 is moved to the open position where the disc supporting portion 46 is exposed to the outside of the disc player body 31. During this movement of the tray assembly 33 the disc 40 is held in the upper limit position by the four claws 59 of the lifter 41, and is hence carried without making any contact with the turntable 39. When the tray assembly 33 reaches the open position, the pin 135 of the cam member 115 contacts and urges the actuator 138 of the limit switch 137 to make an electrical contact with the contact 139 as shown in FIG. 18(C), with the result that the control circuit including the actuator 138 and the contact 139 reverses the electric motor 111 to thereby turn the cam member 115 slightly in the direction F until the actuator 138 returns to the neutral position. The motor 111 is thus deenergized, thereby stopping the rotation of the cam member 115. It is to be noted that in the open position of the tray assembly 33, the cam member 115 is mechanically prevented from rotating for further opening the tray assembly by the abutment of the stopper 124 of the cam member 115 against the stop pin 142.

After the tray assembly 33 is pulled forward in this way, the disc 40 placed within the disc supporting portion 46 is manually replaced by a new disc. Then, the electric motor 111 is rotated in the reverse direction by depressing the tray assembly shutting button switch and thus the cam member 115 is reversed to thereby return the tray assembly 33 to the shut position, after which the cam follower 102 of the clamping assembly 34 comes into contact with the inclined portion 132 and thereby begins to descend. During the descent of the cam follower 102 the projection 51 of the tray assembly 33 makes an abutment with the tooth-free portion 129 of the cam member 115 with a predetermined frictional force, thus preventing the cam member 115 from being rotated by the cam follower 102 at an excessively high speed. This avoids generation of impact noise and prevents the disc 40 and clamping assembly 34 from being damaged. More specifically, during this descent of the cam follower 102, the toothed portion 128 of the cam member 115 is, as already described, disengaged from the rack 50. On the other hand the cam follower 102 makes a strong contact with the inclined portion 132 since it is urged by the coil spring 108. There is a possibility that the cam follower 102 forcedly rotates the cam member 115 at a higher speed than the motor 111 with the result that the cam follower 102 lowers along the inclined portion 132 at an excessively high speed because in this stage the cam follower 102 and the motor 111 drives the cam member 115 to rotate in the same direction. Although the gear member 118 and 119, pinion 117 and motor 111 serve as loads to the cam member 115, these loads cannot avoid this possibility since the drive directions of the cam member 115 by the cam follower 102 and the motor 111 are, as described above, the same. Should the cam follower 102 be lowered at an excessively high speed, the clamping disc 92 of the clamping assembly 34 would strongly impinge upon the disc 40 placed on the turntable 39. Thus, the disc 40 could be clamped against the turntable 39 in an impact manner and the actuator stub 105 might impinge upon the push stub 66 to thereby cause the ridge 103 to engage with the recess 104 also in an impact manner. These phenomena could produce an impact noise and give damages to the disc 40 and the clamping assembly 34. According to the present invention such possibilities are avoided by abutting the projection 51 formed in the tray assembly 33 against the tooth-free portion 129 with a predetermined frictional force at least during the vertical movement of the cam follower 102.

In this manner the cam follower 102 descends at an appropriate speed and the clamping disc 92 is hence slowly lowered. Simultaneously, the actuator stubs 105 depress the respective push stubs 66, thus rotating the lifters 41 to thereby lower the claws 59 to the lower limit positions. By doing so the disc 40 is placed on the turntable 39 and then clamped against the turntable 39 by the clamping disc 92. At this moment the ridge 103 engages with the recess 104 to lock the tray assembly 33. At this stage of operation, the cam follower 102 is located at the flat portion 131 of the cam portion 125, and the pin 136 of the cam member 115, as shown in FIG. 18(A), urges the actuator 138 of the limit switch 137 to electrically contact the contact 140. This causes the control circuit to reverse the motor 111 so as to slightly rotate the cam member 115 in the direction E until the actuator 138 returns to the neutral position, where the motor 111 is stopped. In this way the setting of the disc 40 is completed.

At this stage, by depressing the push button switch the motor 137 is energized for rotating the disc 40 clamped on the turntable 39 and the signals recorded in the disc 40 is thus reproduced by a signal reproducing device (not shown).

In the above-described embodiment, the tray assembly 33 and the clamping assembly 34 are driven by a single drive mechanism using a cam member 115. This single drive mechanism simplifies the drive system of the tray assembly 33 and the clamping assembly 34 and the control system for timing operations of these assemblies and enables to readily provide accurate operation timing of each of the tray assembly 33 and clamping assembly 34.

The tray assembly 33 is provided at the disc supporting portion 46 with a pair of lifters 41, of which claws 59 stick out of and retracts from the bottom wall of the disc supporting portion 46 for raising and lowering the information carrier disc 40 and the lifter 41 is interlocked with the clamping assembly 34 and the tray assembly 33. While the tray assembly 33, having the disc 40 placed on the disc support portion 46, is horizontally moved with respect the turntable 39 disposed in position, the disc 40 is held by the lifters 41 and 41 at the upper limit position higher than the level of the turntable 39 and the disc 40 is then lowered to be centered on the turntable 39 when it is set to the turntable 39. Thus, smooth setting of the disc 40 on the turntable 39 is achieved.

The turntable 39 and the drive mechanism thereof are mounted to the player body and the lifters 41 and 41 are provided to the tray assembly 33 instead of the turntable 39 being arranged to be vertically movable as in the prior art disc player. The tray assembly 33 is hence reduced in size and weight and the drive mechanism of the tray assembly is simplified and miniaturized.

The lifter 41 is driven in an interlocking relation with the clamping assembly 34. This simplifies the drive mechanism of these devices and provides accurate operation timing to them, thus enabling to avoid any possibility of giving a damage to the disc.

During playback of a disc 40 clamped on the turntable 39, the tray assembly 33 is locked in position by engaging with the clamping assembly 34 for preventing unintentional movement of the tray assembly 33 to thereby protect the disc 40.

The clamping assembly 34 is provided with a predetermined load during vertical movement thereof. This prevents any excessively high speed downward movement of the clamping assembly 34, thus avoiding production of damages to the clamping assembly 34 and the disc 40 during the vertical downward movement of the clamping assembly 34.

What is claimed is:

1. An automatic setting device of a disc player, comprising:

means for loading an information carrier disc, wherein the disc loading means includes a tray assembly having a disc support portion and is supported on a disc player body to be horizontally movable between an open position at which the information carrier disc is placed on the disc support portion and a shut position at which the information carrier disc is positioned on a turntable and rotated for playback by rotating the turntable;

a clamping assembly movable between an upper limit position and a lower limit position to clamp the information carrier disc against the turntable when the tray assembly is in the shut position;

single drive means, mounted on the disc player body, for both driving the loading means and actuating the clamping assembly, wherein the drive means includes a cam member, supported in a stationary position with respect to the disc player body and having a cam portion and a first toothed portion;

a toothed member on the tray assembly and meshing with the first toothed portion of the cam member for driving the tray assembly to move between the open position and the shut position; and a cam follower member on the clamping assembly and following the cam portion of the cam member, whereby the tray assembly and the clamping assembly are actuated by the cam member via the first toothed portion and the toothed member and via the cam portion and the cam follower member, respectively.

2. An automatic disc setting device as recited in claim 1, wherein the cam member is rotatably mounted on the disc player body, the cam portion is a cylindrical cam, the first toothed portion is a pinion and the second toothed portion is a rack coupled to the tray assembly.

3. An automatic disc setting device as recited in claim 2, wherein the clamping assembly is supported on the disc player body to be vertically pivotable between an upper limit position and a lower limit position.

4. An automatic disc setting device as recited in claim 2, wherein the clamping assembly is spring biased toward the lower limit position to clamp the information carrier disc and a projection having a distal end projecting from the level of the top faces of the rack is provided on the tray assembly adjacent to the rack, and the cam member has a tooth free portion adjacent to the first toothed portion and adapted to make a frictional contact with the projection to slow down the vertical movement of the clamping assembly.

5. An automatic disc setting device as recited in claim 1, wherein the tray assembly is movable solely in a horizontal direction, the device further comprising a lifter including claws for supporting the disc, the claws being disposed on the tray assembly so as to selectively extend and retract from an upper face of the disc support portion and adapted to retract from the upper face of the disc support portion in an interlocking relation with the clamping assembly to place the information carrier disc on the turntable when the tray assembly is in the shut position.

6. An automatic setting device as recited in claim 1, wherein the tray assembly and the clamping assembly are provided with formations adapted to interengage for locking the tray assembly when the tray assembly is in the shut position.

7. An automatic disc setting device as recited in claim 6, wherein the formations comprise a first projection formed in the clamping assembly and a recess formed in the tray assembly and adapted to engage with the first projection.

* * * * *